Aug. 16, 1949.  A. F. KENYON ET AL  2,479,370
ROTARY WELDING APPARATUS
Filed Sept. 8, 1945
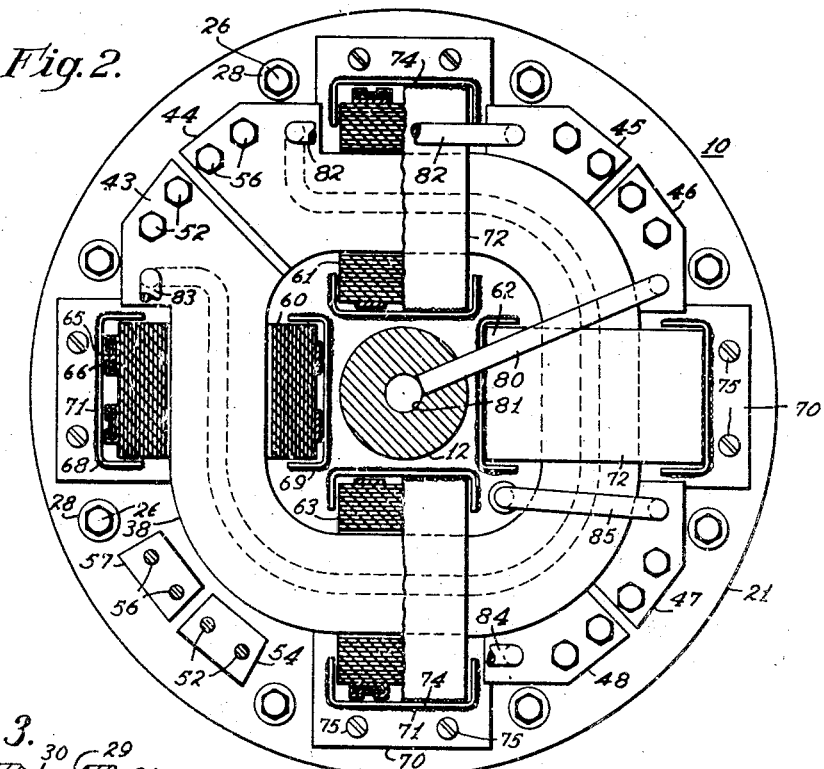
Fig. 2.
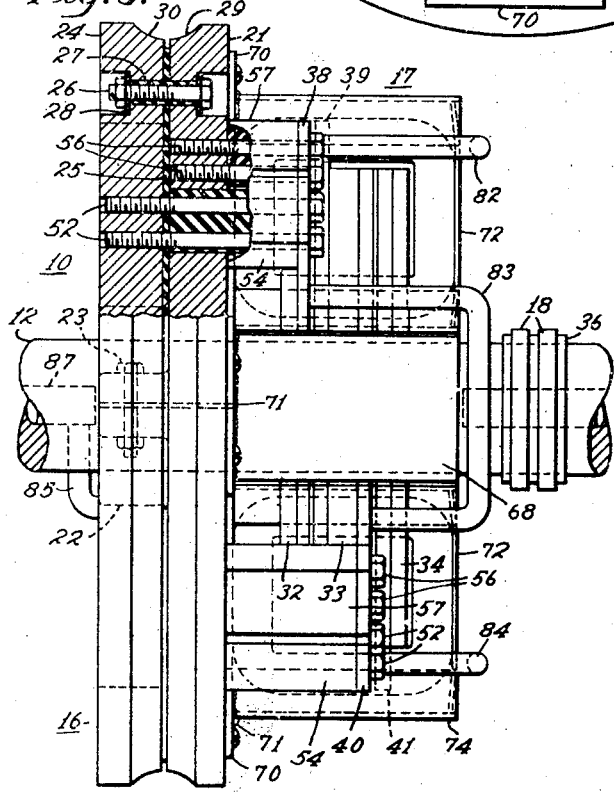
Fig. 3.
Fig. 1.
INVENTORS
Alonzo F. Kenyon &
Theodore Specht.
BY
G. M. Crawford
ATTORNEY Patented Aug. 16, 1949

2,479,370

UNITED STATES PATENT OFFICE 2,479,370

ROTARY WELDING APPARATUS

Alonzo F. Kenyon, Wilkinsburg, and Theodore Specht, Sharon, Pa., assignors to Westinghouse Electric Corporation, East Pittsburgh, Pa., a corporation of Pennsylvania Application September 8, 1945, Serial No. 615,176

11 Claims. (Cl. 219—6)

Our invention relates, generally, to welding apparatus and it has reference, in particular, to rotary welding apparatus and transformers for use in resistance welding.

Generally stated, it is an object of our invention to provide a rotary transformer welding unit which is simple and inexpensive to manufacture and is easy to operate and maintain.

More specifically, it is an object of our invention to provide a compact and efficient rotary welding transformer having a plurality of secondary winding sections arranged for connection at spaced peripheral points to a welding electrode to provide a substantially uniform flow of welding current at different points about the periphery of the electrode.

Another object of our invention is to provide a rotary transformer using pancake transformer windings which are positioned about a shaft adjacent spaced welding electrode members and are arranged for connection to the welding electrode members at uniformly spaced intervals.

Yet another object of our invention is to provide for a uniform flow of welding current at different points about the periphery of a pair of rotatable welding electrode members.

It is also an important object of our invention to provide a rotary transformer which occupies a minimum of space axially of the shaft on which it is mounted.

Yet another object of our invention is to provide a rotary transformed having coaxial interleaved primary and secondary pancake winding sections, which are linked at peripherally spaced points by common core sections of magnetic material.

Other objects will in part be obvious, and will in part be explained hereinafter.

In practicing our invention, a pair of circular welding electrode members are mounted side by side upon a rotatable shaft and insulated in relation to each other. Adjacent the electrode members, a transformer is positioned, having interleaved primary and secondary pancake winding sections coaxially positioned about the shaft. The secondary winding sections comprise substantially closed loops, which have their opposite terminals connected to different ones of the electrodes at points displaced peripherally about the electrodes. Common core members of magnetic material link the primary and secondary winding sections at uniformly spaced intervals.

For a more complete understanding of the nature and scope of our invention, reference may be made to the following detailed description, which may be studied in connection with the accompanying drawing in which:

Figure 1 is a partial front elevational view of welding apparatus using the invention in one of its forms;

Fig. 2 is an enlarged partially sectioned, end-elevational view of the rotary transformer welding unit shown in Fig. 1; and Fig. 3 is an enlarged, front-elevational view of the rotary transformer welding unit, partly broken out to show how the secondary winding sections are connected to the welding electrode members.

Referring to Fig. 1, the reference numeral 10 may denote, generally, a rotary transformer welding unit which may be mounted on a shaft 12 rotatably supported in suitable bearings 14 and 15. The welding unit 10 may comprise a rotary electrode 16 and a rotary transformer 17, which may be positioned adjacent the electrode for supplying welding current thereto, and provided with slip rings 18 for effecting a connection to a suitable source of electrical energy. The electrode 16 may be disposed to engage a member to be welded such as, for example, the pipe 19, which may be positioned between a pair of pressure rolls 20.

Referring to Figs. 2 and 3, it may be seen that the electrode 16 may comprise a substantially circular main electrode disc member 21 having a central boss 22 with an opening for receiving the shaft 12. The boss may be split transversely and provided with means such as the bolts 23 for clamping the disc to the shaft. The adjoining portion of the electrode may comprise an auxiliary electrode ring member 24, which may be separated from the disc 21 by means of insulation 25. The main and auxiliary electrode members may be secured together in insulated relation by means of the bolts 26, insulating tubes 27 and insulating washers 28. The main disc 21 and auxiliary ring 24 may be provided with adjacent surface portions 29 and 30, which may be shaped to conform more or less with the surface of the pipe 19 or other member which is to be welded.

In order to provide for passing a flow of welding current between the main and auxiliary electrode members through the member to be welded, the rotary transformer 17 may be positioned immediately adjacent the electrode members and electrically connected thereto. The transformer 17 may, for example, comprise a plurality of pancake primary winding sections 32, 33 and 34, which may be positioned about the shaft 12 in spaced relation with each other on one side of the electrode, in substantially coaxial relation with the shaft. Suitable connections may be made to the primary winding sections from a source of electrical energy through the slip rings 18, which may be mounted on the shaft 12 and insulated therefrom by means of suitable insulation 36.

The supply of electrical energy to the main and auxiliary electrode members may be effected by means of a plurality of substantially similar pancake secondary winding sections 38, 39, 40 and 41. These winding sections may comprise relatively flat, single-turn or part-turn loop conductors. They may be formed in any suitable manner, being, for example, cast or formed of copper strap or the like, with projecting terminals 43, 44; 45, 46; 47, 48, etc., at the ends.

The secondary winding sections may be interleaved with the primary winding sections, and so arranged that the opposite terminals of the different sections may be connected to the main and auxiliary welding electrode members, respectively, at spaced intervals about the periphery thereof. For example, the terminal 43 of the winding section 38 may be connected to the auxiliary welding electrode member 24 by means of bolts 52, which pass through the main welding electrode member 21 into threaded engagement with the auxiliary welding ring 24. The bolts 52 may be insulated from the main electrode member 21, and the terminal 43 may be maintained in proper spaced relationship to the welding electrode member 21 by means of an insulating support or spacer 54, which may be positioned in an opening through the main electrode member 21 and be provided with openings for receiving the bolts 52. The adjacent terminal 44 of the secondary winding section 38 may be connected to the main welding electrode member 21 by means of bolts 56, which pass through an insulating spacer 57 into threaded engagement with the main welding disc 21.

The terminals 45 and 46 of the secondary section 39 may be connected to the main and auxiliary electrodes in a similar manner, but at a point spaced, for example, 90 degrees from the point of connection of the terminal projections 43 and 44, respectively. In a like manner, the terminal projections of the other secondary winding sections may be connected to the main and auxiliary electrodes at equidistant spaced intervals about the periphery.

Inductive coupling of the primary and secondary winding sections may be effectively provided by means of a plurality of magnetic core sections 60, 61, 62 and 63, which magnetically link the winding sections at spaced intervals. These core sections may be of any suitable construction comprising, for example, pairs of oppositely-disposed C-shaped sections of flatwise wound magnetic strip material positioned on opposite sides of the winding sections and clamped together by means of banding strips 65 and suitable clips 66 in a manner well-known in the art. The core sections may be supported by means of oppositely disposed channel-shaped brackets 68 and 69, which may be positioned about the inner and outer portions of the core sections and secured to a mounting plate 70 by means such as welding 71.

Covers 72 may be provided between the brackets, which may be forced against the core sections by having the end portions pressed inwardly and secured to the brackets by means of welding 74. The mounting plate 70 may be secured to the main electrode member 21 in any suitable manner, such as by means of screws 75.

In order to provide for cooling the transformer 17, the secondary winding sections may be provided with internal passages for a cooling fluid which passages may be cast therein, machined or otherwise formed in a suitable manner. Connection to the internal passages may be made by means of a pipe 80 from an axial opening 81 in the shaft for supplying a cooling fluid to the different secondary winding sections through pipe connections 82, 83, and 84. An outlet for the cooling fluid may be provided by means of a pipe 85 extending from the terminal 47 through the main electrode disc 21 for connection with an axial opening 87 in the shaft on the other side of the welding electrode.

When welding, the primary winding sections may be continuously energized, whereupon the secondary winding sections which are effectively connected in parallel relation supply welding current to the main and auxiliary electrodes in continuously varying degrees. For example, when the terminal projections 43 and 44 of the secondary winding section 38 are nearest the pipe 19 which is being welded, the secondary winding section 38 supplies the principal portion of the welding current. The other secondary winding sections 39, 40 and 41 supply welding current in proportion to the distance of their terminal connections from the point of contact with the pipe 19. As the terminal connections of each secondary winding section in turn approach the point of contact with the pipe 19, the current supplied by these sections gradually increases to a maximum and then decreases as the terminal connection moves away from the point of contact.

From the above description and the accompanying drawing, it will be apparent that we have provided a rotary welding transformer unit which is simple and inexpensive to manufacture and is easy to maintain. By reason of the use of primary and secondary winding sections being of the pancake type, the axial length of the transformer is reduced to a minimum. By interleaving the primary and secondary winding sections and connecting the terminal connections of the secondary sections to the welding electrodes at spaced intervals about the peripheries thereof, a transformer construction is provided wherein the windings are operated most nearly at a maximum efficiency during the entire welding period, and a substantially steady flow of welding current is obtained for all positions of the welding electrodes relative to the work upon which the welding operation is being performed.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. A transformer comprising, support means, inductively related primary and secondary transformer windings disposed in spaced relation to the support means in relatively fixed side-by-side relation, said secondary windings having a plurality of separate sections, each provided with terminal portions projecting therefrom, the terminal portions of the separate sections being displaced angularly of each other, means connecting the terminal portions to the support means, and a plurality of separate core members of magnetic material secured in fixed relation with and linking the primary and secondary windings at spaced intervals.

2. In a rotary welding unit, a pair of rotary electrode members mounted on a shaft in spaced and insulated relation, and a transformer comprising a support member supported by one of the electrode members having coaxially related primary and secondary windings thereon positioned about the shaft on one side of the electrode members with the secondary winding connected between said electrode members, and a plurality of magnetic core members secured thereto and looped about said windings at spaced intervals.

3. A rotary welding unit comprising, a pair of welding electrode members mounted on a shaft in spaced and insulated relation, a mounting plate mechanically supported on one of the electrode members only a plurality of interleaved pancake primary and secondary winding sections each positioned about the shaft adjacent the mounting plate for supplying electrical energy to the electrode members, and magnetic core means linking said windings secured to the mounting plate, whereby they are supported by said one of the electrode members.

4. In a rotary welding unit, a pair of rotary welding electrode members positioned in side-by-side and insulated relation and having central openings disposed to receive a shaft, a plurality of relatively flat interleaved primary and secondary windings positioned about the openings for shaft on one side of the electrode members and substantially parallel therewith, each of said secondary windings having a pair of terminals disposed in spaced relation and said pairs of terminals being so displaced angularly relative to each other that the terminals are connected to different ones of the electrode members at spaced intervals about their peripheries, and a plurality of magnetic core members positioned about the windings at spaced intervals and mounted on one of the electrode members.

5. A rotary transformer comprising, a relatively flat disc-like support having an opening for a shaft therein, a plurality of pancake primary winding sections positioned in spaced relation on one side of the support concentric with the opening, a plurality of looped pancake secondary winding sections interleaved with the primary winding sections and having terminals at opposite ends of each loop, said windings being disposed with the terminals displaced equidistantly about the support, a plurality of closed magnetic core members positioned in spaced relation on the support and linking the primary and secondary winding sections at spaced intervals and retaining means for each of the core members including individual bracket members secured to the support and partially enclosing the core members.

6. In a rotary welding transformer, a pair of annular welding electrode members mounted on a shaft in spaced and insulated relation, a plurality of pancake primary winding sections positioned coaxially and in spaced relation with the shaft on one side of the electrode members and supported therefrom in spaced axial relation, a plurality of relatively flat secondary winding sections comprising substantially closed loops having terminals adjacent the opposite ends of the loops, said secondary windings being displaced angularly of each other relative to the electrode members, means connecting the terminals to one or another of the electrode members at spaced intervals, and magnetic core members supported from at least one of the electrode members only, and linking the primary and secondary windings at intervals intermediate the different terminal connections.

7. A rotary welding transformer comprising, a relatively flat support member having an opening for receiving and means for supporting it on a shaft, a plurality of magnetic core members mounted substantially radially on the support member in fixed relation about the opening, said core members having windows therein positioned in planes extending radially of the shaft, and a plurality of primary and secondary winding sections positioned in and common to said windows, different of said secondary winding sections having terminals displaced peripherally of each other, and mechanically connected to the support member.

8. A rotary welding transformer comprising, support means having an opening therein for and disposed to be supported by a shaft, a plurality of pancake primary windings positioned in spaced relation on one side of the support concentrically with respect to the opening, a plurality of single-turn secondary winding sections interleaved with the primary windings and having radially extending terminal projections of opposite polarity adjacent the ends of the turns, said secondary winding sections having connections at the terminal projections for a cooling fluid, means connecting the terminal projections to the support means to secure the primary and secondary windings in fixed relation thereto, and a plurality of spaced core members common to said windings.

9. A rotary welding transformer unit comprising, a disc electrode having a central boss with an opening for receiving a shaft, a ring electrode positioned on the boss side of the disc electrode and secured thereto in spaced and insulated relation, a plurality of pancake-type primary winding sections positioned on the other side of the disc electrode in spaced relation axially of each other flatwise relative to the disc electrode and coaxially with the shaft opening, a plurality of single-turn secondary winding sections interleaved with the primary winding sections and having projecting terminal portions, said secondary winding sections comprising with the primary winding a common winding structure and being angularly displaced relative to each other so as to provide for connecting the terminal portions to the disc and ring electrodes at spaced angular intervals to support the windings on the electrodes, and a plurality of magnetic core members positioned about the primary and secondary windings comprising the common winding structure at angularly spaced intervals said magnetic core members being mounted on the disc electrode.

10. A rotary transformer comprising, a disc-like support means, a plurality of coaxial pancake primary winding sections positioned in spaced relation, a plurality of coaxial single-turn pancake secondary winding sections interleaved with the primary winding sections and secured to the support means, said sections having terminal portions of opposite polarity projecting radially adjacent each other with means including a plurality of pipe connections to provide passages for a cooling medium, and a plurality of separate core members mounted on the support means and surrounding the primary and secondary winding sections at spaced intervals and securing them to the support means.

11. A rotary transformer comprising, a relatively flat support plate having a central opening, a plurality of interleaved primary and secondary winding sections mounted on the support plate on one side thereof and coaxial with the opening, a plurality of split core members positioned about the windings at spaced intervals, and retaining means for each of the core members including a pair of opposed channel shaped bracket members secured to the plate on opposite sides of the core member and having a cover extending therebetween for holding the core member in fixed relation to the support.

ALONZO F. KENYON.
THEODORE SPECHT.

REFERENCES CITED

The following references are of record in the file of this patent:

UNITED STATES PATENTS

| Number | Name | Date |
| --- | --- | --- |
| 1,585,158 | Livingston | May 18, 1926 |
| 1,851,517 | Jones et al. | Mar. 29, 1932 |
| 1,865,532 | Lutz | July 5, 1932 |
| 2,052,963 | Caputo | Sept. 1, 1936 |
| 2,052,964 | Caputo | Sept. 1, 1936 |
| 2,283,940 | Morris | May 26, 1942 |
| 2,318,095 | Putnam | May 4, 1943 |
| 2,341,943 | Ogden | Feb. 15, 1944 |
| 2,388,473 | Dunton | Nov. 6, 1945 |
| 2,390,174 | Roemer | Dec. 4, 1945 |